United States Patent [19]

Shanklin et al.

[11] 4,219,988
[45] Sep. 2, 1980

[54] AUTOMATIC HIGH-SPEED WRAPPING MACHINE

[75] Inventors: Frank G. Shanklin, Groton, Mass.; Francis X. King, Jr., Nashua, N.H.

[73] Assignee: Shanklin Corporation, Ayer, Mass.

[21] Appl. No.: 840,645

[22] Filed: Oct. 11, 1977

[51] Int. Cl.² ................. B65B 9/06; B65B 51/26
[52] U.S. Cl. .................................. 53/550; 53/568; 53/372; 53/373
[58] Field of Search ............... 53/28, 180 R, 182 R, 53/184 S, 229, 372, 373, 550, 553, 568; 93/DIG. 1; 156/515, 583

[56] References Cited

U.S. PATENT DOCUMENTS

| | | | |
|---|---|---|---|
| 2,114,621 | 4/1938 | Bergstein | 93/18 |
| 2,114,622 | 4/1938 | Bergstein | 53/373 |
| 2,376,646 | 5/1945 | Ackerman et al. | 112/138 |
| 2,883,813 | 4/1959 | Shannon | 53/372 X |
| 3,011,295 | 12/1961 | Brugger | 53/372 |
| 3,015,601 | 1/1962 | Fener | 156/583 X |
| 3,015,920 | 1/1962 | Saumsiegle | 53/372 X |
| 3,191,356 | 6/1965 | Zelnick et al. | 53/229 |
| 3,355,857 | 12/1967 | Tobey | 53/553 |
| 3,411,263 | 11/1968 | Smorderen | 53/553 X |
| 3,420,035 | 1/1969 | Deans et al. | 53/182 R |
| 3,490,194 | 1/1970 | Monaghan | 53/372 X |
| 3,513,629 | 5/1970 | Hoagland et al. | 53/550 |
| 3,552,088 | 6/1971 | Niwa | 53/182 R |
| 3,583,888 | 6/1971 | Shanklin | 53/182 R |
| 3,619,970 | 11/1971 | Zelnick | 53/568 |
| 4,016,026 | 4/1977 | Grevich | 156/583 X |
| 4,019,307 | 4/1977 | Ballestrazzi et al. | 53/182 R |
| 4,035,984 | 7/1977 | Gerlach et al. | 53/28 |

Primary Examiner—John Sipos
Attorney, Agent, or Firm—Charles E. Pfund

[57] ABSTRACT

An automatic high-speed wrapping machine for wrapping packages in heat sealable thermoplastic film is disclosed wherein the film seal at the side and ends of the packages is made at a high rate of speed as the packages travel through the machine. The packages travel continuously in a straight line through the machine and are delivered at the input end of the machine by a flighted infeed conveyor into a film inverting head where the packages are surrounded by the film, thence to the side sealing mechanism which forms a seal while severing the selvage from the packages, then into an end sealing mechanism where both ends of the packages are sealed and the film web connecting succeeding packages is severed. The machine produces packages which have a sealed film wrap around the entire package which is then in condition for subsequent shrinking of the film if desired to provide a package having a tight film overwrap.

21 Claims, 9 Drawing Figures

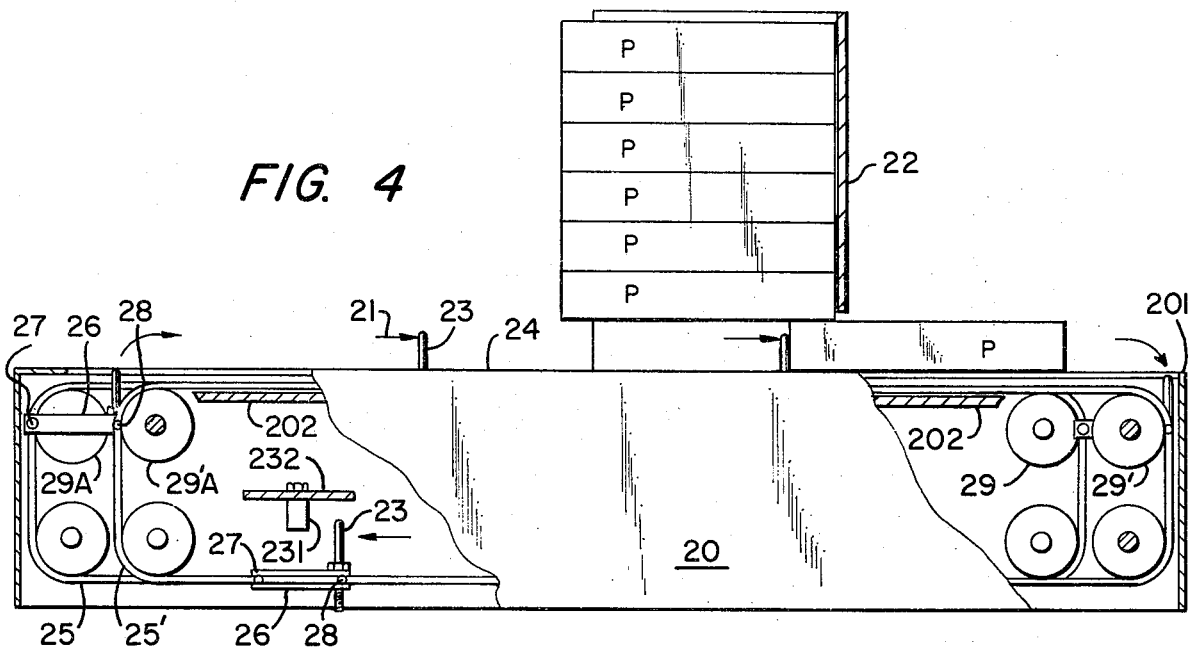
FIG. 4
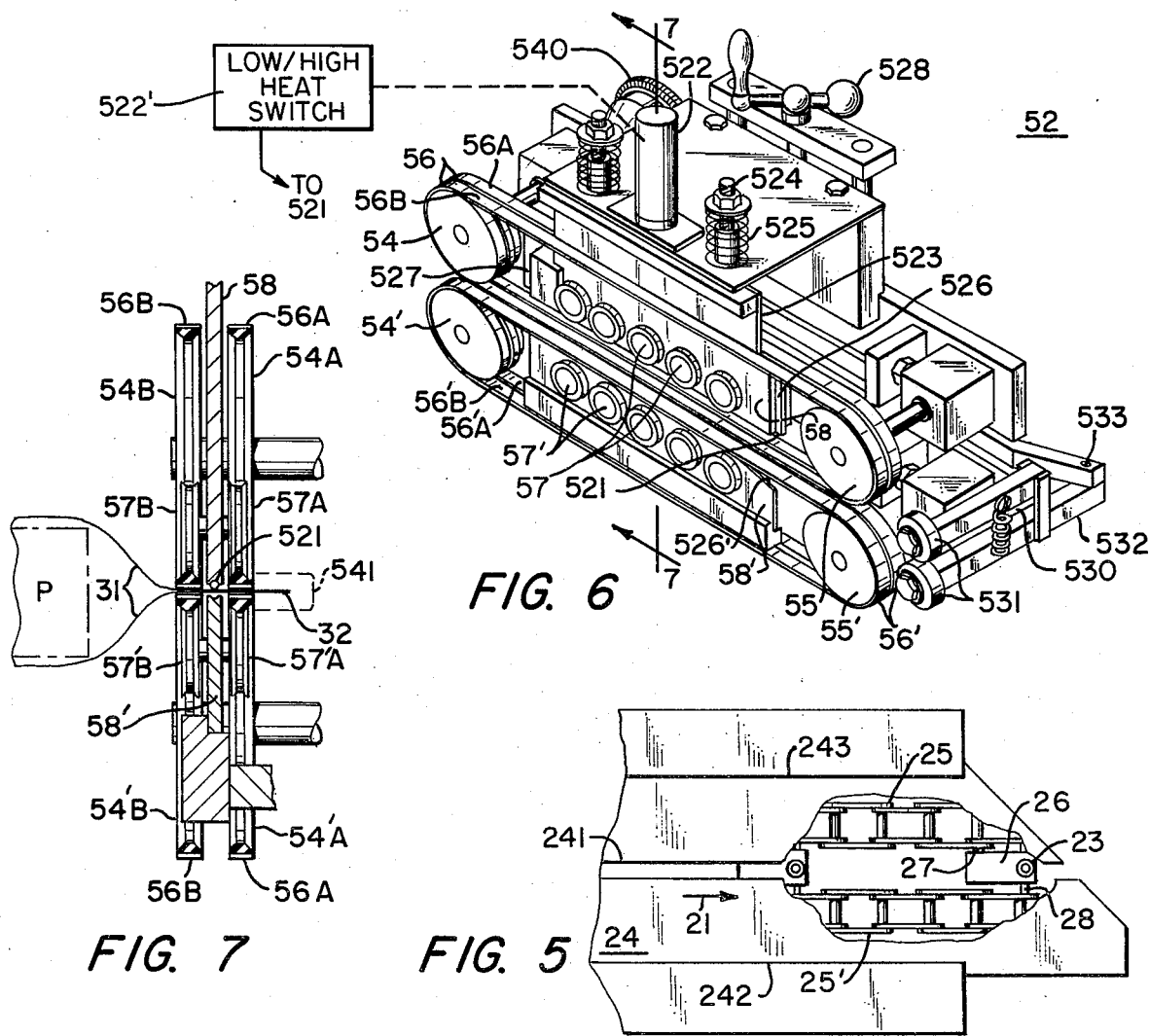
FIG. 6
FIG. 7
FIG. 5

AUTOMATIC HIGH-SPEED WRAPPING MACHINE

BACKGROUND OF THE INVENTION

This invention relates to automatic package wrapping apparatus and in particular to apparatus which wraps the product in heat sealable thermoplastic film and seals the edges of the film to totally encase a product within the film where the package moves continuously at a high rate of speed through the machine.

The prior art discloses apparatus for wrapping packages in thermoplastic film in which the packages move intermittently as does the plastic film in which they are to be wrapped. The intermittent movement of the packages through the apparatus occurs because it is necessary to stop the packages during the sealing operation where the sealer is stationary. Some of these machines are known as L-sealers because they form "trim seals" in the shape of an "L" utilizing a web of centerfolded film. The "trim seals" were formed by clamping the top and bottom webs of the folded film between a padded bottom jaw and a top jaw containing a narrow heating element which formed a neat weld bead (i. e., "trim seal") of melted film while severing the film containing the product from the adjacent portion of the film. Thus one of the valuable features of L-sealers is that the packages they make are neat and attractive having neat "trim seals" on three sides and clear film on the fourth side and top and bottom.

More recent machines have utilized a continuous longitudinal sealer and an end sealer which moves at approximately the velocity of the packages as they travel through the machine so that it is not necessary to stop the packages while performing the end sealing operation. Such prior art machines have generally been of three types. One type had a continuous ultrasonic side sealer and a complex series of multiple flighted end sealing jaws which were spaced for a particular product. This type required substantial set-up time for change in length of product to be wrapped. A second machine of this type, while making packages similar to those produced on an L-sealer worked by drawing film off a roll under tension, folding it around the product, drawing it past a hot knife side sealing mechanism under continuous tension by means of a conveyor belt and an overhead pressure belt located downstream of the sealing mechanism, and then formed the end seal with a moving end sealer. A disadvantage of this type of machine is that it is not capable of making satisfactory seals on all commercially available heat sealable thermoplastic films. A further disadvantage involves the overhead pressure belt which precludes its use on fragile or delicate products.

A third type had an overlapped longitudinal seal on the top or bottom of the packages wrapped. Since the overlap not only ran along the bottom of the packages but also ran halfway up both ends, the packages lacked the neat appearance and hence the sales appeal of the trim sealed packages as made on the L-sealers. Since many of the products so wrapped are sold in self-service retail stores, the appearance of the package has an important effect on the sales of the product. An additional disadvantage of the overlapped seal is that the width of the web of film must be precisely correct, requiring an exact width film for each size of product.

An important disadvantage of all three types of machines is that the film must be under continual tension in order to track properly over to the forming heads on such machines, necessitating means for gripping the packages and/or the film to draw the film into the machine and over the head such as vacuum conveyor belts, pressure belts, and moving flighted end sealing mechanisms.

It is a primary object of this invention to provide an automatic high-speed wrapping machine in which the flow of packages through the machine is continuous without need to stop while forming trim seals at one side and both ends of the packages.

It is a further object to provide a machine which is capable of handling both high and low profile packages and packages of variable length and width with only relatively simple adjustments when the package size is changed.

It is a further object to provide reliability and quality in the packaging of products.

It is a further object to provide a machine which is designed to resist jamming and to continue to function even though a package or packages may be improperly located when end sealing is attempted so that the malfunction may be corrected without shutting down the assembly line.

It is a further object of this invention to provide a machine which is safe for operators and which does not crush packages in the case of the aforementioned malfunction.

Another object is to provide a simple means of sealing the free edges of a folded web of film together to form a tube surrounding products operable continuously without having to stop the travel of the product.

It is a further object of this invention to provide trim seals on three sides of the packages and clear (i.e., not overlapped) film on the fourth side and top and bottom of the package so that the final appearance of the package is identical to that produced on an L-sealer.

It is a feature of the machine that it can utilize all known commercially used heat sealable thermoplastic films and achieve reliable end and side seals with the desirable trim seal appearance.

Another feature of the invention is to provide a machine with film flow through the machine sufficiently tension-free so that film and product will flow without any need for pressure gripping conveyors which can damage delicate products.

It is a feature of the machine to provide an infeed conveyor mechanism which has positive feed of the packages into the machine thereby causing the packages to be equally spaced thereby increasing the quality of the sealed packages.

Other objects and features of this invention will become apparent from the following description of the preferred embodiment of the invention when read in conjunction with the figures in which:

FIG. 4 is a side view, partially in cross-section, of the infeed conveyor.

FIG. 5 is a partial cut-away view of the chain drive of the infeed conveyor.

FIG. 6 is a perspective view of the side sealing mechanism.

FIG. 7 is a cross-sectional view of the jaw portion of the side sealing mechanism.

DETAILED DESCRIPTION OF PREFERRED EMBODIMENT

Figure 1:
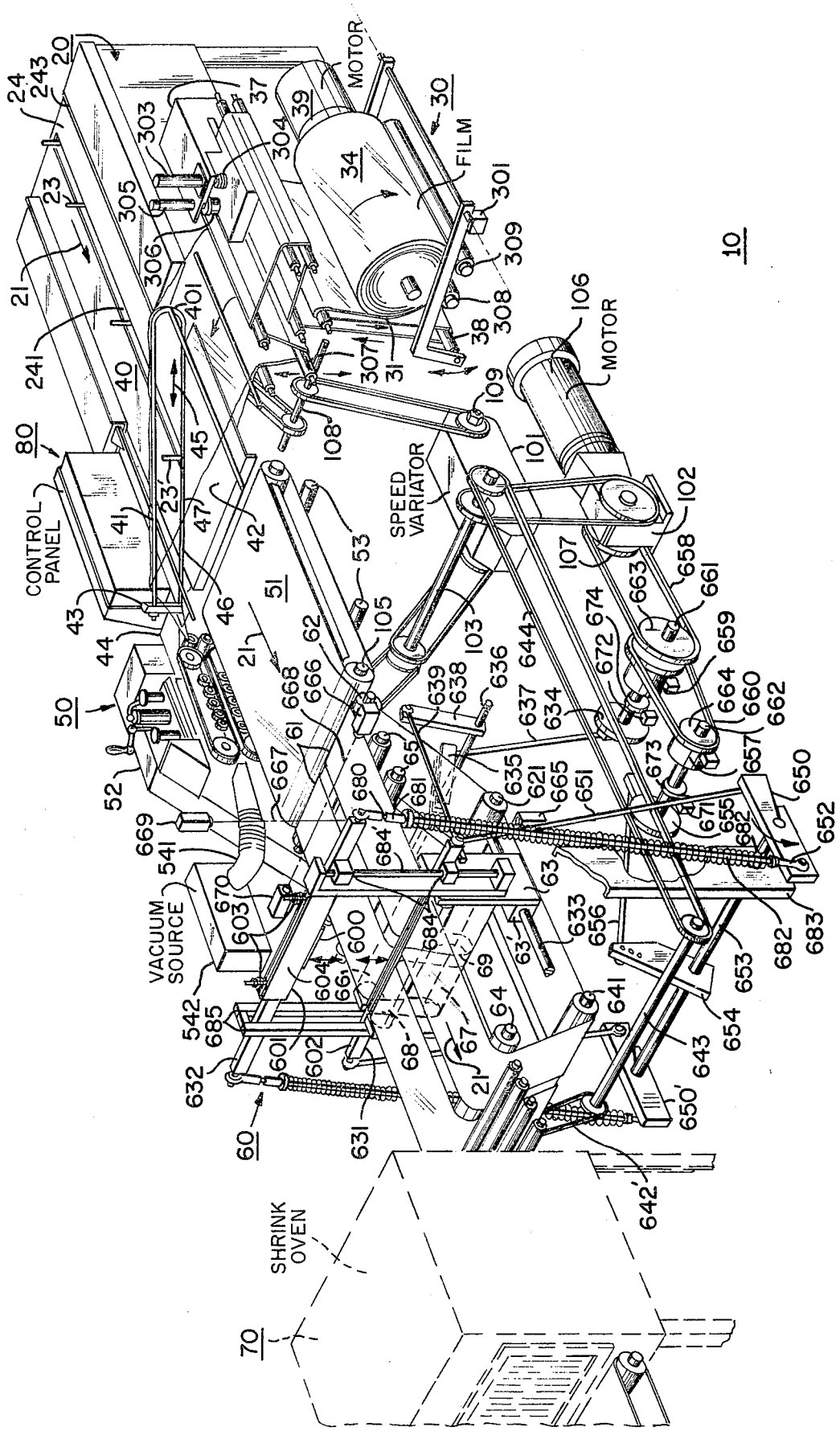
FIG. 1 is a perspective view from the rear of the highspeed film wrapping machine of this invention with guards removed to expose the details.

A perspective view of the automatic high-speed film packaging machine generally designated 10 of this invention is shown in FIG. 1. FIG. 1 shows sections of the machine generally designated including an infeed conveyor 20, a film dispenser 30, an inverting head section 40, a side sealer 50, an end sealer 60, and a control panel 80. Products to be wrapped in film enter the machine 10 via infeed conveyor 20. The conveyor 20 delivers the spaced-apart products to the inverting head 40 section where a folded film from a roll of film in dispenser 30 surrounds the product. The folded film enveloping the product is sealed at its loose edges by the side sealer 50 to form a tube of film enclosing the spaced products. The selvage at the sealed edge is severed and removed. The film between the products is sealed and severed at the end sealer 60 to produce individual sealed packages of the product.

The machine wraps a product in a flexible plastic film in which the travel of the product through the machine is in a straight line and is essentially continuous. The film 31 is supplied to the machine 10 as a folded web at right angles to the direction 21 of flow of the product P (shown in FIGS. 2 and 3) through the machine. The film 31 is provided to inverting head 41 where the film is redirected and turned inside out to provide a film traveling in the same direction as the packages delivered by the infeed conveyor 20. A detailed description of the inverting head and the manner in which it changes the direction of the film feed is contained in U.S. Pat. No. 3,583,888, which is incorporated herein by reference.

The infeed conveyor 20 pushes products into the inverting head 40 to cause them to be enclosed by the folded film supplied by film dispenser 30 on the top, bottom, and one side of the product with the other side of the product adjacent to the edges of the folded film. The product thus enclosed in the web of film travels with the film past a side sealing mechanism 50 in FIG. 1 which seals the two free edges of the folded film together to form a continuous tube of film which envelops the succession of products which are being fed into the machine by infeed conveyor 20. The side sealer also severs the excess width of film from the tube and this selvage is removed by a vacuum source. As the product progresses further through the machine 10, an end sealing mechanism, denoted generally by the numeral 60, seals the trailing edge of each package while simultaneously sealing the leading edge of the succeeding package in the machine and it also severs one package from the other while the packages are traveling without stopping through the machine. The end seal mechanism 60 is so designed that it travels a short distance with the package at substantially the same velocity as the package while the seal is being made. After the seal has been made, the sealing mechanism releases from the film and returns to its original position to repeat the transverse seal for the next package. The wrapped package may then be conveyed through a shrink tunnel 70, shown in phantom view in FIG. 1, if shrinking of the film around the package is desired.

Because the package being wrapped in the film proceeds through the machine 10 at a substantially uniform velocity, the machine is capable of operating at film web speeds as high as 120 feet per minute although 60 to 100 feet per minute is a more typical speed. The machine is capable of wrapping in excess of one package per second.

Figure 2:
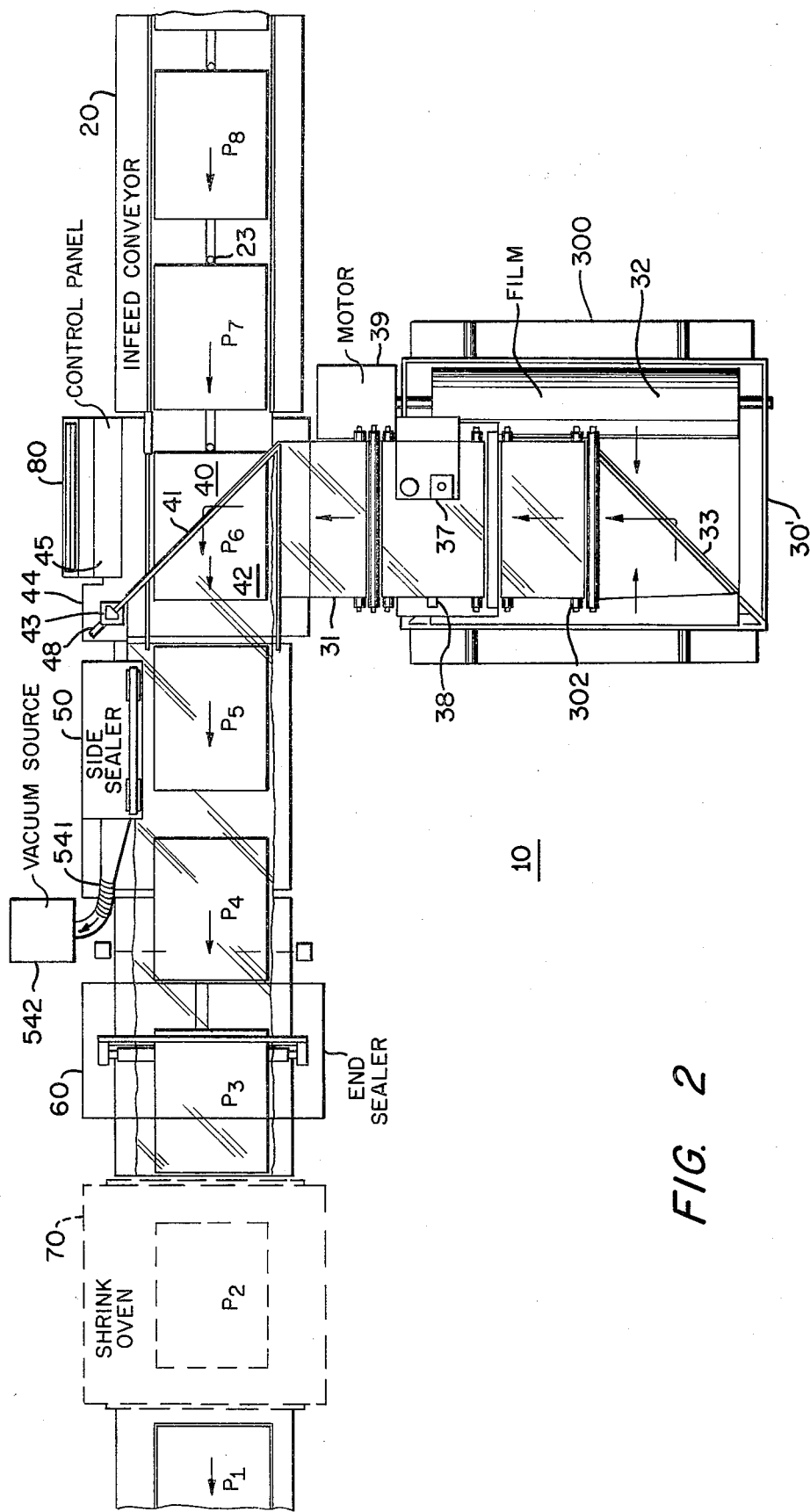
FIG. 2 is a top view of the machine of FIG. 1 showing the packages as they travel through the machine and in addition showing a film folding mechanism.

FIG. 2 shows a top view of a packaging machine 10 which is essentially the same as that shown in perspective in FIG. 1. The major component parts 20-70 of the machine 10 are shown in schematic form in FIG. 2. In addition, packages P1-P8 are shown as they pass through the machine.

The film feed mechanism 30' of the FIG. 2 differs from the film feed 30 of FIG. 1 in that film feed 30' utilizes a roll of unfolded film 32 which is folded on folding mechanism 33 to produce a folded web 31 corresponding to that contained on the roll 34 of FIG. 1. In all other respects, the machines represented in FIGS. 1 and 2 are identical. Suitable film folding mechanisms are well known to those skilled in the art.

Figure 3:
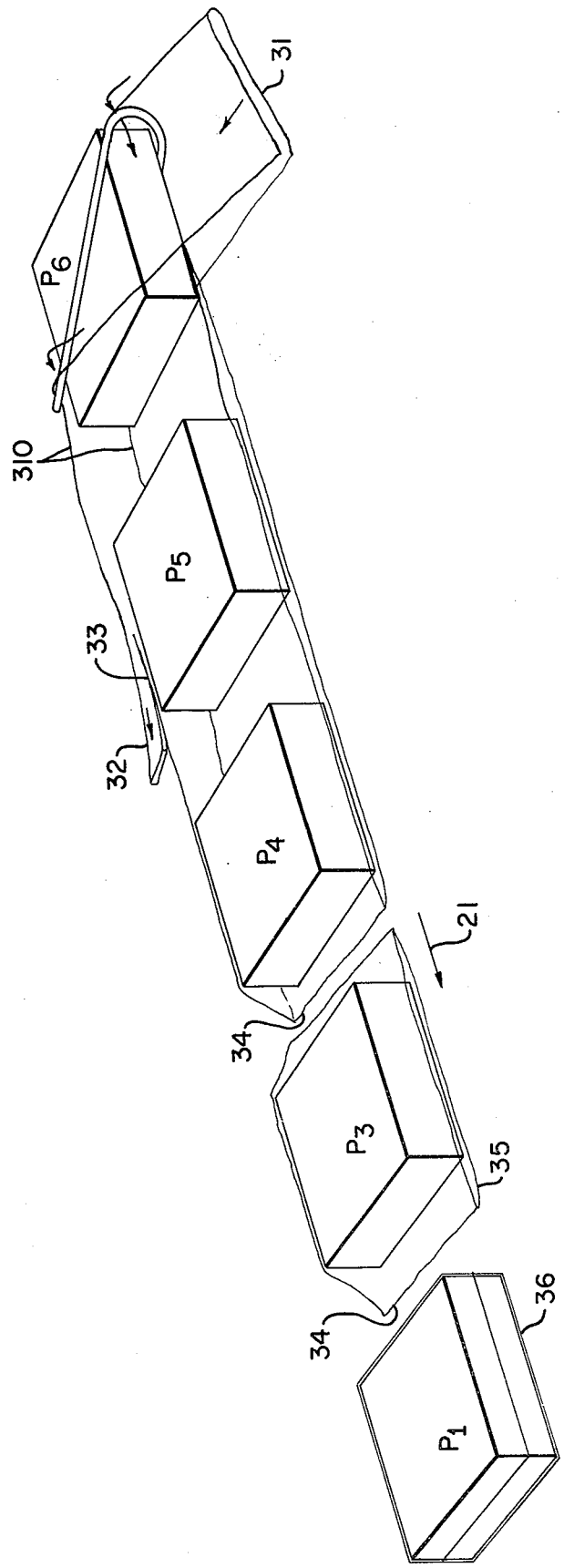
FIG. 3 is a perspective view of the packages of FIG. 2 showing the state of the film sealing procedure of corresponding packages.

FIG. 3 shows the various stages of wrapping of successive packages with the plastic film 31 as the packages proceed through the machine. Package P6 is shown in FIGS. 2 and 3 as being partially covered by the folded film 31 as it passes into the inverting head 41. Package P5 is shown exiting the side sealer 50 with the selvage 32 of the film being separated from the side sealed package P5 and being collected by vacuum hose 541. The side seal 33 completes the tube envelope of relatively loose plastic film around packages P4, P5 with a trim seal.

The end sealing mechanism 60 produces a trim seal 34 between the packages P3 and P4. The end sealing mechanism also severs the plastic along the seal 34 so that package P3 is not only totally enclosed by the sealed film 35 but is also separated from the package P4 at the seal 34. The package P1 is shown as it exits from a heat shrink oven 70 where the loose fitting film envelope 35 around package P3 can be shrunk to form a tight fitting film cover 36.

The component parts and the assembly in combination of the continuous high-speed wrapping machine 10 of FIG. 1 will now be discussed in detail.

INFEED CONVEYOR

As stated earlier, products are fed into the machine 10 by an infeed conveyor 20 of FIG. 1 which is shown in more detail in the front side view of FIG. 4. The infeed conveyor 20 comprises a pair of transversely spaced, longitudinally-offset chain belts 25, 25', each in a vertical plane, which extend longitudinally along the conveyor. The chain belts 25, 25' are supported by driving pulleys 29, 29' and longitudinally separated idler pulleys 29A, 29'A, respectively. The longitudinally extending upper portion of the belts is supported by a longitudinal plate 202 in proximity to and under the longitudinally-extending slot 241 in the support surface 24. Plates 26 are positioned between the chain belts 25, 25' and are pivotally connected to the belts at two longitudinally separated points, one pivot connection to each belt. The plates have detachably-connected vertical lugs 23 which project through the slot 241. A switch 231 is mounted on the conveyor in a position such that the lugs 23 may actuate the switch. The product stacking feed 22 of conventional design may be used with the conveyor 10 although other product feeds, well known in the art, are frequently used.

The products P which are to be wrapped in machine 10 are stacked above the infeed conveyor 20, as shown in FIG. 4. The stacking device 22 holds the products P so that they are transversely centered with respect to their subsequent line of travel through the machine and with respect to the slot 241 of conveyor 20.

A power source (not shown in FIG. 4 and to be discussed later) powers the drive pulley 29' which moves the chain belt 25' in the direction 21. The plate 26 causes the belt 25 to move at the speed of belt 25'. The lugs 23 attached to the plates 26 are moved along the slot 241 in table 24 in direction 21 and push out the lowermost package P in the stacker 22. The lugs 23 of plates 26 push on the trailing end of the package P advancing the package into the inverting head 40 portion of the machine at a predetermined spacing and a predetermined rate. As the lugs push the product along the top plate 24 of the conveyor, the front and rear side guides 242 and 243, respectively, keep the package centered on the lug 23.

Important features of the infeed conveyor 20 of this invention are that the lugs 23 disengage smoothly from the package as the package leaves the infeed conveyor lug 23 near the inverting head and that the lugs can get very close to the inverting head. In order to accomplish this, the lugs 23 maintain a vertical position near head 40 as they are brought down from the surface 24 at the end 201 of the infeed conveyor 20. If only a single sprocket and chain were used, the lugs would swing forward and down. Therefore, in this invention two parallel chains are used to provide a conveyor system where the lugs 23 always maintain a vertical position.

The plates 26 are positioned between the chains 25, 25' with pivot point 27 of the plate 26 pivotally connected by a pin on chain 25 and the other pivot point 28 being pivotally connected by a pin on chain 25' as shown in FIG. 5. The distance between the pivot points 27, 28 is equal to the longitudinal separation of the centers of the sprocketed pulleys 29 and 29' (also 29A and 29'A) around which the chains 25, 25' travel. Pulleys 29, 29' (and pulleys 29A and 29'A) have their centers in the same horizontal plane. When these conditions are met, plates 26 will assume a horizontal position at all times as they travel along the infeed conveyor with the chains 25, 25' thereby maintaining the lugs vertical.

The spacing between the lugs 23 must, of course, be greater than the longitudinal dimension of the package P, thus for large packages there will be plates 26 to which no lug is attached. Since the lug spacing can only be placed at intervals determined by the spacing of the plates 26, it is necessary to vary the speed of the conveyor chains 25, 25' in order to feed the packages into the inverting head with the desired spacing between packages. The spacing between the packages is controlled by using a speed variator 101 between the main drive system of 102 of the machine 10 and the infeed conveyor 20. In the preferred embodiment of the invention, the speed variator 101 is a commercially available variable speed transmission for varying the speed of the infeed conveyor drive shaft 108 which is in turn connected to a drive (not shown) which drives the sprocket pulley 29' of the infeed conveyor. Thus, if the speed of the infeed conveyor lugs 23 is increased, the spacing between the packages as they exit the inverting head 41 is decreased.

A plate 202 secured to the top 24 is spaced from and under the longitudinal slot 241 to allow the plates 26 to rest on the plate 202 and provide stability of lugs 23 while the packages are being pushed along the top of conveyor 20. A torque limiter clutch 109 is provided between the output of the speed variator 101 and the infeed conveyor drive shaft 108. The torque limiter clutch 109 causes the drive to slip in the event that the lugs 23 experience a force greater than that normally to be expected in pushing the packages along the table 24 as when a jam-up occurs at head 40.

Also shown on the infeed conveyor 20 in FIG. 4 is a limit switch 231 which can be moved longitudinally along the conveyor 20 and secured in a desired position by fastening to stationary plate 232. The switch 231 is activated by the lugs 23 as they return down the conveyor 20 to trigger the hole punch mechanism 37 shown in FIG. 1 or to sequence any other machine operation with the lug 23 movement.

Since the inverting head is at an angle of 45° with respect to the direction 21 of product flow, the end 201 of conveyor table 24 is caused to be at a 45° angle as shown in FIG. 5. The angled end allows the slot 241 and table 24 to terminate very near the inverting head 41.

Lug 23 is preferably secured to the leading edge of plate 26 which is nearest the inverter 40. This feature allows the lug 23 to approach very closely to inverting head 41 since it may extend to the end of the slot 241 in top plate 24 of conveyor 20 and therefore lug 23 acts as a positive force in inserting nearly the entire product into the film 31 at inverting head 41. This feature results in the products being evenly spaced in the film tube 31 when exiting the inverting head with a resultant improvement in the quality of the sealed packages at the output of the machine 10.

FILM INVERTER

The film inverter 40 of this invention comprises an inverting head 41, a triangularly shaped table 42, and a fixed bed 44 supporting a movable post 43 to which the head 41 is attached. The film inverting head 40 inverts the film in the same manner as described in U.S. Pat. No. 3,583,888, for the automatic L-sealer. However, because the machine of this invention does not use an L-sealer, the film inverter 40 has been substantially modified.

As previously stated, the product P is centered with respect to the infeed conveyor slot 241 by means of guides 242 and 243. It is known from the teaching of the patent referred to above, that the fold in the web of film 31 which occurs at the end 401 of the inverting head 41 should be close to the edge of a product as the product enters the inverting head regardless of the product width. Therefore, the end 401 must be moved laterally with respect to the slot 241 dependent upon the width of the package to satisfy this objective. It is also desired that the lugs 23 push the product fully into the inverting head 40 independent of the width of the package.

In order to satisfy these objectives simultaneously, the inverting head 41 must be aligned with and moved in direction 45 at an angle of substantially 45° with respect to the direction 21 of the package flow. The inverting head bed 44 which supports head 41 has a slot 48 at this 45° angle. Post 43 slides into this slot 48 moving inverting head 41 in direction 45. The lower arm 46 of the head 41 moves along the edge 47 of the table 42 which is also at the 45° angle.

The fold in film web 31 should be provided at inverting head end 401 substantially at right angles to the direction 21 of package flow for optimum operation of the inverting head. Roll of film 34 is located in proper axial position by adjustable stops, not shown, so the fold of the film is in position for proper tracking over the inverting head 41. Since inverting head 41 is moved at a 45° angle to adjust for product width, film roll 34 will have to be shifted axially to maintain the alignment for adjusted positions of the inverting head 41. Where a center folder is used as in FIG. 2, the mechanism 30' also is moved along support rails on a base 300 to maintain the same relationship of the film with respect to the inverting head.

As the package emerges from the inverting head 41, there is film over it and between it and the table 42 so that the package will be carried across table 42 by the film onto the side seal conveyor 51 of the side sealer 50.

FILM DISPENSER

The wrapping machine 10 of this invention uses folded film 31 from a roll 34 as in FIG. 1 or from a roll 32 of flat film which is folded in the film dispenser 30' as in FIG. 2 to form a folded film 31. The film dispenser 30 comprises a roll 34 of film supported on two rollers 308, 309, a motor 39, a dancer roll 38, a hole punch 37, and another dancer roll 307.

A powered film unwind system is used in which a slight tension on the film web 31 raises dancer roll 38 to activate a switch 301 which starts a motor 39 which drives roller 308 which turns the roll of film 34 (or flat film 32) in a direction to provide film to the machine. The motor 39 must at all times provide film in excess of the maximum speed of the products on the infeed conveyor 20 in order to insure minimum tension of the film as it passes over the inverting head 41. It is apparent, however, that the drive motor may be dispensed with if the roller 308 is clutched into the main drive of the machine, and the dancer roll 38 is used to control the clutch.

The hole punch 37 shown in FIGS. 1, 2, and 4 comprises a cylinder 305 which has a thick sponge rubber pad 306 to stop the film 31 while a hole is being perforated. The other cylinder 303 has a thinner rubber pad 304 mounted to a ball punch and a round die which punches the hole in the film. Another dancer roll 307 is placed between the hole punch 37 and the inverting head 41 because the flow of film at the inverting head 41 is continuous whereas the film flow is momentarily stopped at the hole punch 37. The change from momentary stops in film flow to continuous film flow is absorbed by vertical motion of the dancer roll 307. As stated earlier, the hole punch cylinder 303 and the film stop cylinder 305 can be triggered by the adjustable position limit switch 231 on the infeed conveyor 20 in which case a hole is located where wanted on each package. Alternatively, the hole punch 37 may be triggered from a cam on one of the driving shafts of the machine so that a hole will be placed periodically along the film. The mode of operation that is used will depend upon the type and size of package to be run and how much air should be vented out of it.

SIDE SEAL MECHANISM

The side seal mechanism 50 is shown in relation to the other portions of the packaging machine 10 in FIG. 1 and in detail in FIGS. 6 and 7.

The side seal mechanism 50 comprises a conveyor belt 51 and a side sealer 52. The height of side sealer 52 is adjustable with respect to belt 51 and both are attached to a frame which is movable laterally on rails 53 with respect to the line of travel of the product down the machine. The side sealer 52 comprises two pairs of belts 56, 56', with idler pulleys 55, 55', and drive pulleys 54, 54', whose drive is coupled to that of the conveyor belt 51, a pair of jaws 58, 58', a heating element 521 along the edge of one of the jaws, sets of belt-pressure rollers 57, 57' on each jaw, an air cylinder 522 for moving one jaw into contact with the other, and a pair of angled rollers 531 at the film input to said jaws.

As the package P6 of FIGS. 2 and 3 leaves the inverting head 41, it is transferred to the conveyor belt 51 of the side seal mechanism 50. Since the package always runs down the center line of the machine, it is necessary to adjust the side sealer 52 toward or away from the center of the machine in order to accommodate narrower or wider packages. In order to accomplish this, the side sealer 50 is mounted on two parallel rails 53 fixed to the frame (not shown) of the machine 10 which rails run transversely to the direction of package flow. Sealer 50 is moved away from or toward the center of the machine by conventional means as by turning a crank attached to a screw (both not shown). The side sealer 52 produces a seal 33 at the free edges 310 of the film at the desired distance from the edge of the package.

Figure 9:
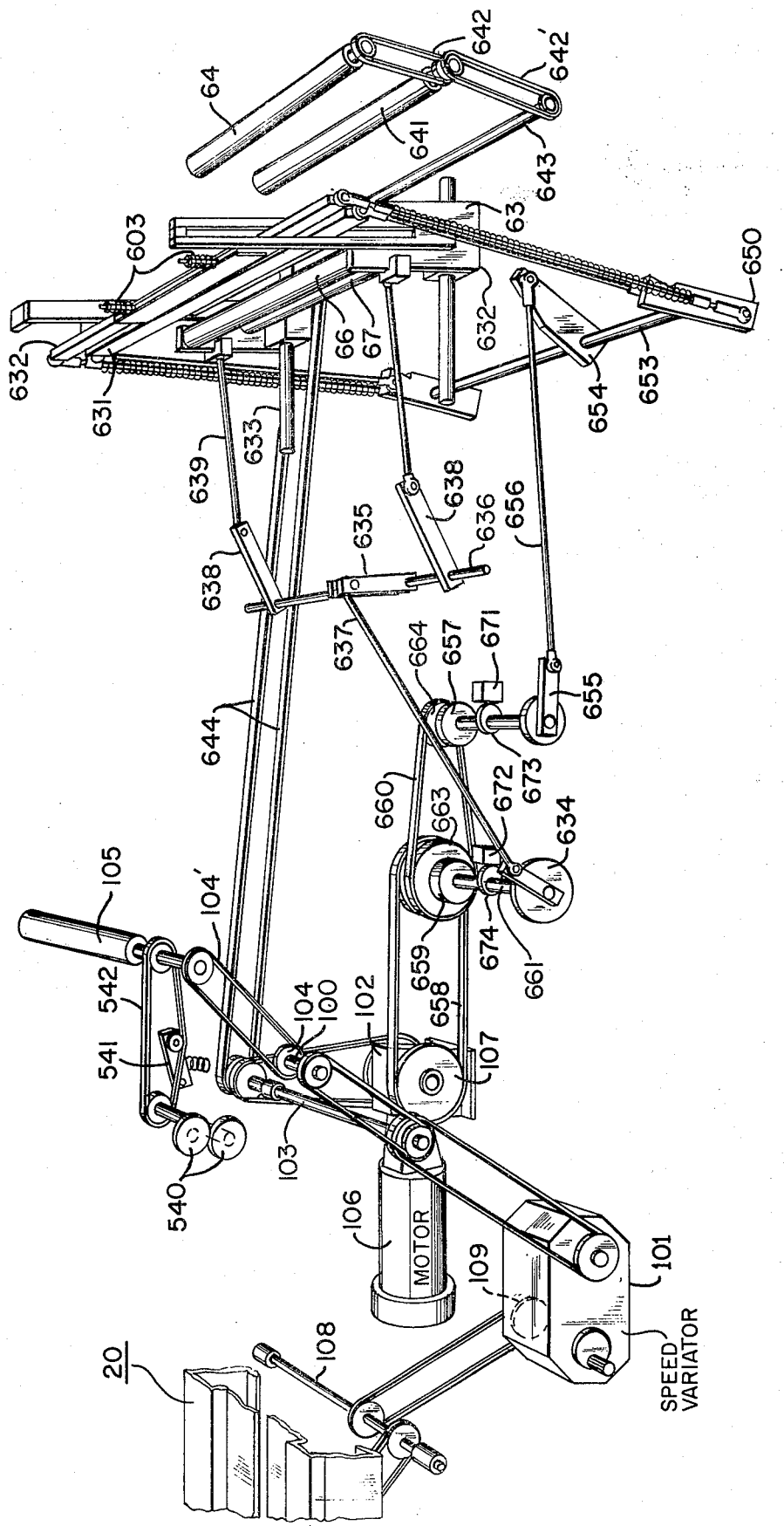
FIG. 9 is a schematic of the power transmission mechanism of the entire machine.

As shown in FIG. 1 and in FIG. 9, power is transmitted to the side sealer conveyor 51 and the side sealer 52 from the main drive mechanism 102 to shaft 103 to shaft 100 which has a key way. Shaft 100 is rotatably mounted to the machine frame. A sprocket 104 is rotatably secured by a bearing (not shown) to a conveyor belt 51 support frame (not shown). Sprocket 104 having a captured key slides along the key way in shaft 100 as the conveyor 51 and side sealer 52 are moved transversely. Therefore, as the shaft 100 rotates, the sprocket 104 will rotate no matter what its position axially on the shaft. Thus, the sprocket 104 maintains a constant spatial relationship with respect to roll 105 which it drives by chain 104'. Roll 105 drives the conveyor belt 51 and the side sealer 52. Since the side sealer 52 is capable of being moved vertically with respect to conveyor belt 51, a spring tensioned idler pulley 541 is provided as a slack take-up for the side seal drive chain 542 between the shaft of roller 105 and side seal belt drive gears 540.

Referring to FIG. 6, a pair of laterally spaced V belts 56 run between each drive pulley 54 and a corresponding idler pulley 55. The upper and lower drive pulleys 54, 54' (and idler pulleys 55, 55') respectively, may be vertically separated by a fixed distance sufficient to cause the belts 56, 56' not to be in contact when the machine is on "stand-by" (no product running). The loose ends 310 of the film 31 which encases the package P6 is inserted between the top pair of belts 56 and the bottom pair of belts 56'. When a side seal is to be made, the belt 56 is moved into pressure contact with belt 56' by idler rollers 57 attached to the upper jaw 58 (film ends 310 intervening). Belts 56' are supported to resist the pressure contact by idler rollers 57' on jaw 58'. The upper jaw 58 has a hot seal wire 521 which runs along its lower edge in a longitudinal direction. When the machine is on stand-by, the upper jaw 58 is in its uppermost position where the hot seal wire 521 is removed from the region between the belts 56A and 56B. However, when the machine 10 is operating and a side seal 33 is being made, air pressure in the cylinder 522 acts to drive the top jaw 58 down so that the upper rollers 57 push the upper belts 56 into pressure contact with the lower belts 56' and at the same time, the hot seal wire 521 moves between the belts 56 where it is placed in contact with the film 31 to produce the side seal 33 on the film surrounding package P4. Two guide rods 524 keep the upper jaw 58 in alignment. A spring 525 on each guide rod 524 provides an upward force on the upper jaw 58 when the air cylinder 522 is not energized to assure that the jaw 58 is in its uppermost position.

For simplicity, the preceding description of the sealing operation has for the most part avoided referring to the fact that the upper belt 56 and its associated pulleys 54, 55, and 57 exist on both sides of the upper jaw 58. Where the description requires more specific identification of the elements, the elements on the side of the jaw farthest from the product being sealed carry the suffix A and those nearest carry the suffix B. The same comment applies to the elements of the lower jaw 58'. It will also be seen that the jaws could be reversed so that the lower jaw could contain the heating element and could be removable from the seal region.

The seal wire 521 runs along most of the length of the jaw 58 from the infeed end 526 to the discharge end 527. As the film has been sealed in the sealer 52 and is emerging at the end 527, a vacuum hose 541 attached to a vacuum source 542 pulls the selvage 32 away from the seal 33 before the selvage 32 has an opportunity to become reattached to the seal 33. Other means of removing selvage are known in the art and can be used.

Since the package is being covered with centerfolded film, it is desirable to make the seal at the center of the height of the package. This is accomplished by raising or lowering the sealer 52 by turning a crank 528 which with conventional screw means causes the sealer 52 to ride up or down on a pair of parallel rails (not shown) which are mounted to the conveyor belt frame of the side sealer mechanism 50.

Another feature of the side sealer 52 is a set of spring loaded 350 rubber guide rolls 531 located at the entrance 526 to the sealer 52. The film edges 310 to be sealed are engaged by the rolls 531 prior to passing between the V belts 56, 56'. The rolls 531 are mounted on an arm 532 which is adjustably connected to the sealer 52 by a fastener 533. The rolls 531 can then have their axes of rotation set transverse to the direction 21 of the flow of film in which case a relatively loose wrap around the package is obtained; or if desired, the axis may be angled slightly off transverse to produce a pull on the film toward the sealer 50 as the belts 56, 56' pull the film in the longitudinal direction 21, in which case the film will be pulled more tightly around the package.

The lower jaw 58' is slightly recessed as by tapering at its input end 526' in order to facilitate entry of the film into the region between the jaws since the taper provides a gap between the upper jaw 58 and the lower jaw 58' into which the film is carried by belts 56. While in this tapered region, the film is in proximity with the hot seal wire 521 thereby permitting the film to be preheated and softened prior to its entry into the region where the wire 521 and the lower jaw 58' are in contact. Without the preheating region, the unsoftened film would be clamped between the wire 521 and the lower jaw 58' resulting in a drag in the film with the possibility of tearing the film. That portion of the side seal jaws in which the wire is in intimate contact with the lower jaw provides the pressure between the wire and the lower jaw for severing the film around the package from the selvage and also provides a dwell time with the film in intimate contact with the heating wire which is desirable for proper formation of the trim seal weld bead.

It is seen that the above-described side sealer 52 in conjunction with the vacuum source 542 produces a seal 33 at one edge of the package, and at the same time, severs and removes the selvage trim 32. The products P4, P5 at this stage are spaced from each other in a plastic film tube and are ready for the next step of end sealing and separation from each other.

END SEAL MECHANISM

Figure 8:
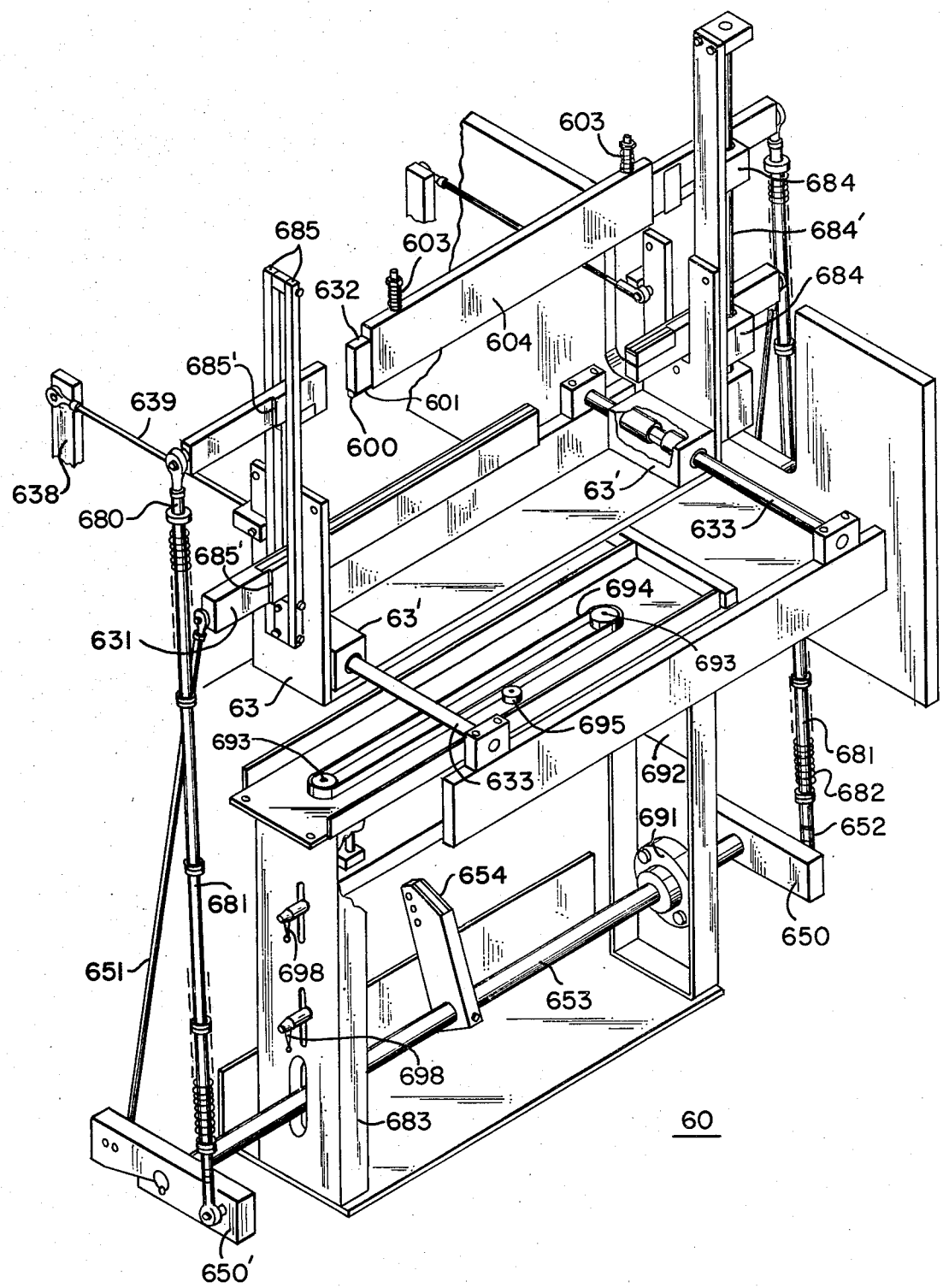
FIG. 8 is a perspective view of the end sealer mechanism.

The end seal mechanism 60, shown in FIG. 1 and in more detail in FIGS. 8 and 9 comprises a carriage 63 having bushings 63' which support it on horizontal shafts 633. On one side, carriage 63 carries a vertical shaft 684' whereas on the other side, carriage 63 carries vertical support 685. The upper 632 and lower 631 jaws extend between bushings 684 on shaft 684' and rest against supports 685. Each end of the upper jaw 632 is pivotally connected to spring loaded connecting rod 652 which is pivotally connected to an end of a rocker arm 650. Each end of the lower jaw 631 is pivotally connected to connecting rod 651 which is pivotally connected to the other end of rocker arm 650. The rocker arms 650 are rotatably connected to frame 683 and are rotated by crank 654. Crank 654 is connected to crank 655 driven by a single revolution clutch 657 powered by motor 106.

Carriage 63 is also connected by push rod 639, cranks 638, 635, and rod 637 to crank 634 driven by single revolution clutch 659 powered by motor 106 to produce back and forth movement of the carriage.

The end seal mechanism 60 has two continuous conveyor belts 61 that run from an infeed roll 62 located in proximity to the belt 51 at the discharge roller 105 of the side sealing mechanism 50. The belts 61 extend through the end sealing carriage 63 to the end or discharge roll 64. Each end seal conveyor belt 61 passes over several support rolls 65 and also drops down over a roll 66, under a bottom roll 67, and then over a roll 68 to form a "U" between the infeed roll 62 and the discharge roll 64.

The top of the "U" is at the same level as the belt 61 as it passes over the end rollers 62,64. The rolls 66–68 are supported by the carriage 63. The depth of the "U" 69 is sufficient to allow the lower jaw 631 of the end sealer carriage 63 to move down below the table surface formed by the belt 61. Belt 61, after it passes over the discharge roll 64, drops down to a roll 641, passes under an idler roll 621, and then back to the infeed roll 62 thereby completing the belt loop. Since there is not much belt wrap on the discharge roll 64, both the discharge roll 64 and its associated return roll 641 are driven by chains 642, 642', respectively, through appropriate sprockets attached to the rolls. Chain 642' is driven by shaft 643 which is driven by chain 644 which is connected to speed reducer 102. Under normal conditions, the speed of the end seal conveyor belts 61 is the same as the speed of the side seal conveyor belt 51 and the side seal belts 56.

In the operation of the end sealer, the end sealing carriage 63, supported by bushings 63' on horizontal shaft 633, moves longitudinally in the direction 21 at approximately the same speed as the package in order to obtain time to make the end seal 34, shown in FIG. 3, without having to stop the movement of the package through the machine 10. As the carriage 63 moves upstream in the direction of arrow 21 or downstream (opposite to direction 21) the overall length of the belt 61 does not change, but the location of the "U" 69 formed by the three rolls 66, 67, and 68 on the carriage 63 changes. Thus, the carriage 63 can be moved back and forth without changing the length of the belt 61 thereby eliminating the need for spring-loaded take-up rolls, etc.

The back and forth motion of the carriage 63 is obtained from a crank 634 located at the base of the machine which is connected by a connecting rod 637 to a crank 635 on an idler shaft 636. The idler shaft 636 acts as a form of bell crank with two cranks 638, one at each side of the machine.

By using two cranks 638, the end seal carriage 63 stays perfectly aligned during its entire travel back and forth during the sealing operation. The cranks 638 are connected to the end seal carriage 63 by pivoted push rods 639. One complete revolution of the crank 634 causes the carriage 63 to move back and forth along the direction 21 to complete one cycle.

The end seal jaws 631, 632 are caused to come together and to open in synchronism with the longitudinal back and forth motion of the carriage. The jaws are brought together during the forward motion of the carriage 63 and at closure the jaws move at about the same velocity as the film surrounded packages. After completion of the sealing which occurs during the closing of the jaws, the jaws open sufficiently to clear the next succeeding package and travel back toward the input roller 62 where they remain open and stationary until signaled to move in the forward direction and to close for the next sealing operation.

The top end seal jaw 632 has an electrically heated wire 600 which runs along its bottom edge 601. The bottom edge comprises a layer of electrically and thermally insulating material which is capable of withstanding the temperature of the hot wire. The lower end seal jaw 631 has on its upper edge 602 a teflon fiberglass cloth backed with a silicone rubber pad and a sponge rubber pad. Springs 603 load a film clamp 604 on the upper jaw. The edges of clamp 604 (an inverted elongated U-shaped clamp) extend below and on both sides of the hot wire until the jaws are fully closed. The clamp 604 also helps to remove some tension from the film while the seal is being made. In order to make a seal, the top jaw 632 moves downward and the bottom jaw 631 moves upward until the two jaws meet at the center line of the packages. The motion of the jaws 631, 632 is accomplished by connecting them to a rocker arm 650 by connecting rods 651 and 652, respectively. Each end of the jaws 631, 632 are so connected. The rocker arm 650 is connected by a shaft to a crank 654 located near the center of the shaft 653. The crank is in turn driven by a crank 655 to which it is connected by a rod 656. The shaft 653 connected to the two rocker arms 650 ensures that at all times the jaws move parallel to one another and that the sealing pressure is the same at both ends of the jaws. The crank 655 is driven at a speed about twice that of the crank 634 which provides the forward and backward motion of the sealing carriage 63.

The crank 634 is driven by chain 658 through a single revolution clutch 659. A single revolution clutch is one where after being energized the clutch will execute a single revolution at which point it is automatically denergized. Such clutches are available commercially. Chain 658 is driven by the main drive motor mechanism 102. Chain 658 in turn provides the power to chain 660 by pulley 663 on shaft 661. Chain 660 provides power to the crank 655 through the clutch 657 by a sprocket 664 approximately half the diameter of the sprocket 663 on shaft 661.

The single revolution clutch 659 is energized to make a mechanical connection between the crank 634 and its corresponding drive pulley 663 in response to an electrical signal from either photocell 665 (or 666). An energizing electrical signal is produced by the photocell 665 (666) when the light beam 667 (668) from light source 669 (670) ceases to be interrupted as at the end of the package. The photocell-light source combination 665, 669 is preferred for flat packages such as phonograph records; whereas the photocell-light source combination 666, 670 is preferred for packages of substantial height. Either one but not both of the photocell-light combinations is used for a particular package run. As stated previously, the signal from the photocell 665 (666) energizes the clutch 659. This clutch remains energized until automatically turned off by one complete revolution of the clutch.

Switch 672 is controlled by cam 674 to turn on single revolution clutch 657 and to reset the photocell 665 (666) in readiness for the production of another energizing signal from the next package. When energized, clutch 657 rotates pulley 655 and cam 673 through a single revolution. Cam 673 closes switch 671 during the single revolution thereby applying a higher heating voltage to heating wire 600 using conventional circuitry.

Crank 655 will complete the closing and opening of the jaws 631 and 632 in the time that it requires for the seal assembly 63 to move from its rest position to its farthest forward position. It should be noted that the jaws are closed at a time when the crank 655 produces the greatest extension of the arm 656. This provides a dwell time since the crank has the least effect on the motion of the arm 656 at this time. The closing of the jaws 631, 632 also occurs at a time when the harmonic motion of the carriage 63 is at a point in its travel where the velocity of the carriage 63 is most constant, when the crank 634 is in a point in its rotation where the connecting rod 637 is approximately perpendicular to the crank arm 634. Constant speed could be obtained, if desired, by means of a cam.

The velocity of the jaws coming together is quite great as the toggle crank 654 starts its motion, but as the jaws meet, the top jaw 632 is on the bottom portion of the arc of the toggle 650 and the bottom jaw is at the top portion of the arc of the toggle 650, resulting in a decreased velocity as the jaws approach one another so that the jaws close relatively gently and a continuation of the arc results in increased pressure on the jaws by compression of spring 682 located in connecting rod 652 and produces a dwell time for the seal to be made.

The jaws 631, 632 are opened and closed by connecting rods 651, 652, respectively. The connecting rod 652 between the rocker arm 650 and the top jaw 632 comprises an inner shaft 680 and an outer shaft 681 in which the inner shaft slides. These two shafts 680, 681 are connected by a long spring 682 in such a way that after the jaws 631, 632 come together, further motion of the rocker arm 650 further compresses the spring 682. The compression can be adjusted to give whatever seal pressure is required. It should be noted that the long travel of the upper jaw 632 obtainable with the long compression spring prevents binding of the end sealer in the event that a package should become entrapped in the end seal jaws. In the latter case, the spring 682 will merely compress sufficiently to permit the mechanism to continue to operate without closing the jaws. This pressure is light enough so that a fairly stiff package will not be crushed by the jaws.

In order that the end seal be made near the center line of the package, the jaws 631, 632 are caused to be moved as a unit in the same direction to cause the distance above the belt 61 at which they meet to be at the approximate center line of the package being sealed. In order to accomplish this jaw movement, drive shaft 653, its bearings 691, and bearing support plates 692 are moved relative to the channeled housing 683 as shown in FIG. 8. As shaft 653 is moved up or down, the connecting rods 651, 652 cause the jaws 632, 631, respectively, to also move up or down. Locking clamps 698 secure plates 692 to housing 683 at the desired height. The bearings 691 attached to plates 692 are moved in unison by individual screwdrives 693 which are in turn rotated by a common chain 694 attached to a sprocketed height control wheel 695. Thus, rotation of the wheel 695 causes the screws to raise the shaft 653 for a high profile package or to lower it for a low profile package. The seal jaws 631, 632 are guided on one side of the carriage 63 by bushings 684 on vertical shaft 684'. On the other side of the carriage, the jaws are guided by two pieces of vertically extending rectangular steel bars 685. The top and bottom jaws have pads 685' of low friction bearing surfaces bolted to them at the points of contact with the vertical supports 685. The vertical supports 685 are used rather than bushings in order to accommodate the expansion of the jaws without the binding which would occur if bushings were used on both ends of the jaws since the jaws become hot as seals are being made.

The end seal drive assembly shown in FIGS. 1 and 9 has previously been briefly described in conjunction with describing the end seal operation and comprises a variable speed motor 106 driving a gear box 102 with an output provided with an overload protection clutch-pulley 107. The power from clutch 107 is provided through chain belt 658 to the pulley 663. When the machine 10 is running, the input drive pulleys 663, 664 to both single revolution clutches 659, 657, respectively, turn continuously.

It will be apparent to those skilled in the art that smoother operation of the jaw closing and more constant velocity of the carriage could be obtained if a cam mechanism were utilized rather than cranks where the increased complexity is justified.

SEAL WIRE HEAT CONTROL

The side seal film heating wire 521 and the end seal heating wire 600 have low heat input for idling conditions and a high heat input for the condition where the machine is running product and seals are being made.

In the case of the side sealer 52, the idle heat setting occurs when the jaws 58, 58' are open and the machine is in its stand-by condition. High heat input to the wire 521 is established by a switch unit 522' when the pneumatic cylinder 522 is actuated to close the jaws when the machine is running. The circuitry to accomplish the electrical switching will be clear to those skilled in the art from the present disclosure.

In the case of the end seal mechanism 60, the end seal jaw heating element 600 is under the low heat idling condition at all times except when the jaws are being closed when making a seal. The initiation of the high heat condition is by cam-controlled limit switch 671 when cam 673 is rotated by the single revolution clutch 657 of the end seal jaw mechanism as explained earlier.

CONCLUSION

It is apparent from the foregoing description of the machine 10, where reference is made to control of pneumatic cylinders actuating certain devices such as the side sealer and the hole puncher, a photoelectric cell controlling the energization of a magnetic clutch, control of the heat of heating elements 600 and 521, the motor controlled feed of the film and the like can be assembled from control mechanisms known to those skilled in the art. Such control mechanisms may be contained within the control box 80 shown in FIG. 1. Since the functions of these various valves, switches, clutches, etc., have been given in detail, it is believed that those skilled in the art will not need a detailed description of the electrical and pneumatic circuitry whereby these elements are interconnected to practice this invention.

Also, a photocell 665 (666) has been used to trigger the initiation of the end sealer 60 in the preferred embodiment because it has been found that this form of control is the most convenient when packages are to be wrapped which change in length from run to run. In the event of a single product machine, however, such as machines wrapping long-playing records, it should be understood that the end seal mechanism 60 may be directly linked to the main drive of the machine and synchronized with the inflow of the records to the machine without requiring photocell initiation of the end sealer.

Also, a belt infeed conveyor without flights could be hand fed with any length product provided that the spacing of products was accomplished manually. This would be particularly useful for long products such as shelving and door trim. In this type of machine, the infeed conveyor belt would always run at the same speed as the side sealer belt thereby eliminating the need for a speed variator between the main drive of the machine and the infeed conveyor. For non-high speed uses, the machine can be used with an intermittent feed by stopping the conveyors and end seal motion during the end seal operation thereby eliminating the need for carriage 63 to be moveable. If sufficient time is available for the end sealing cycle, jaws 631, 632 could be operated by simpler means such as air cylinders.

It is evident that those skilled in the art, once given the benefit of the foregoing disclosure, may make numerous other uses and modifications of, and departures from the specific embodiments described herein without departing from the inventive concepts. As previously stated, the upper and lower sealing jaws may be reversed as to function with the heating element on the lower jaw instead of the upper as described. Hence the use of such terms as "upper" and "lower" in the claims is not to be construed as a limitation to the orientation shown in the drawings. Consequently, the invention is to be construed as embracing each and every novel combination of features present in, or possessed by, the apparatus and techniques herein disclosed and limited solely by the scope and spirit of the appended claims.

What is claimed is:

1. An automatic film wrapping machine for wrapping products in heat sealable thermoplastic film in which the flow of products through the machine is substantially continuous and in a straight line comprising:
  an infeed conveyor for providing product input to said machine comprising:
    a table having a longitudinal slot extending to at least one end,
    a pair of chain belts longitudinally displaced with respect to one another,
    a plurality of pulleys arranged to support each chain belt in a vertical plane, each belt extending longitudinally along and under said table and extending vertically at least at one table end, each belt being transversely spaced from said slot on different sides of said slot, the upper portions of said belts being in proximity to and extending longitudinally under said table,
    a plurality of horizontal plates each having pivot connections to each chain belt, said pivot connections having a longitudinal displacement on each plate which is the same as the longitudinal displacement of corresponding points on said chain belts,
    a plurality of lugs, each removably and transversely connected to a different plate and projecting vertically upward through said table slot,
    means for driving at least one pulley of a chain belt to cause said belts to rotate in said vertical planes about said pulleys, to cause said plates and lugs to move along said slot to the end of said slot,
    said slot terminating at an edge of said table which is at an angle of 45° with respect to said longitudinal direction,
    said lugs maintaining their vertical projection at the slot termination at the table end as said plates move vertically to cause said lugs to retract below said table;
  a film inverter comprising:
    an inverting head extending at substantially said angle of 45° with respect to the longitudinal direction of said slot in said table,
    means for movably supporting said inverting head,
    an inverting head table,
    means for mounting said movable support means on said inverting head table to allow movement of said support means in the direction of the extension of the inverting head;
  a film supply comprising:
    means for supporting a roll of folded film, said film being provided to said inverting head where said film is inverted,
    means for sensing the slackness of the film between said roll and the inverting head,
    drive means connected to said roll of film for rotating said roll to supply said film to said inverting head in response to said sensing means,
    said infeed conveyor lugs pushing said products into said film supplied inverting head to suround products with film;
  a side sealer comprising:
    an upper pair and a lower pair of laterally spaced longitudinally extending belts, each belt in a vertical plane, each belt of said upper pair being vertically aligned above and spaced from the corresponding belt of said lower pair, each of said belts being supported by at least a pair of pulleys, means for driving at least one of said pulleys and its supported belt,
    an upper jaw supporting upper jaw rollers and supporting a heating element along its lower edge, said upper jaw rollers being disposed on both sides of said jaw, the rollers on one side of said upper jaw being above the lower portion of one of said upper pair of belts, the rollers on the other side of said upper jaw being above the lower portion of the other of said upper pair of belts,
    said upper jaw heating element also being above the space between the lower portion of said upper pair of belts,
    a lower jaw supporting lower jaw rollers, along its upper edge, said lower jaw rollers being disposed on both sides of said lower jaw and in contact with the upper portion of the lower pair of belts, the upper edge of said lower jaw being under and aligned with the heating element along the lower edge of said upper jaw,
    means for forcing said upper jaw down to cause said upper jaw rollers to press the upper pair of belts against the lower pair of belts supported by said lower jaw rollers and to cause said heating element to press against the upper edge of said lower jaw, said heating element being above the space between said upper belts when said forcing means is not actuated,
    said upper and lower pairs of belts having a film input,
    a side sealer conveyor belt adjacent to said inverting head for supporting said film surrounded products and adapted to receive said products from said inverting head,
    said inverter providing the edges of film surrounding the products to the said film input at the space between said upper and lower pair of belts, said film being grasped by said belts and moved longitudinally by said belts when said upper and lower jaws are forced against each other, said film edges being between said heating element of the upper jaw and the edge of said lower jaw to form a seal,
    a pair of angled rollers at the film input of said pairs of belts, said angled rollers making contact with each other and being so disposed that movement of said film in the belt direction by the force exerted on said film by said belts causes a transverse force on said film tending to pull said film in toward said belts and tightening said film about said products;
  an end sealer comprising:
    an end sealer conveyor belt having a horizontal table portion,
    said end sealer conveyor belt being adjacent to and adapted to receive said side-sealed film products from said side sealer conveyor belt,
    means for moving said conveyor belt in a longitudinal direction,
    an upper and lower sealing jaw,
    a toggle having a centrally-located pivot point, a rod pivotally connected at one of its ends to one end of said toggle and to said lower sealing jaw at its other end,
a spring-loaded extensible rod pivotally connected at one of its ends to the other end of said toggle and to the upper sealing jaw at its other end,
a first crank connected to said toggle,
means including a first single-revolution clutch connected to drive said first crank,
said first clutch having an input shaft connected to a first drive pulley,
said upper and lower jaws being guided by a carriage, said carriage being supported on longitudinally extending horizontal rods,
means for moving said carriage back and forth in said longitudinal direction,
a second crank being connected to said moving means,
means including a second single-revolution clutch connected to drive said second crank,
a motor,
said first and second clutches having input shafts connected to said motor to rotate in response to rotation of said motor,
means for providing an electric signal in response to a package on said end seal conveyor belt,
said second clutch being responsive to said electric signal to connect its output shaft to its input shaft and to rotate said output shaft through one revolution,
means connected to said second clutch output shaft to energize said first clutch upon initiation of rotation of said second shaft,
said energized first clutch connecting its output shaft to its input shaft for one revolution of the output shaft,
the input and output shafts of said first clutch rotating substantially at twice the rate of the input and output shafts of said second clutch;
said first clutch output shaft single revolution causing said upper and lower jaws to close and then open by moving said first crank and toggle through a single oscillatory motion to their original positions,
said second clutch output shaft coupled through said crank to said carriage during its first half revolution causing said carriage to move forward at substantially the velocity of said end seal conveyor belt when said jaws are closed, said carriage comprising rollers to provide a "U"-shaped depression in said end seal conveyor belt in which said lower end seal jaw may move vertically, said depression moving with said lower end seal jaw,
said carriage moving to its most forward position from its rest position while said jaws are being closed and opened,
said second clutch output shaft during the second half of its revolution causing said carriage to return to its rest position while said jaws are in their open and rest position,
said upper jaw having a heating element along the lowermost edge to cause said film to seal when said jaws are closed,
said upper and lower end sealer jaws being adjustable to close at the height of the elevation center line of the package.

2. An automatic film wrapping machine for wrapping products in heat sealable thermoplastic film in which the flow of products through the machine is substantially continuous and in a straight line comprising:
an infeed conveyor for feeding said product into said machine at a continuous velocity and spacing,
a folded film inverter,
a film supply for providing folded plastic film to said inverter,
a side sealer,
said product being inserted into said inverter by said conveyor and surrounded by said film in said inverter while continuing to travel at said continuous flow, said inverter providing the edges of said film at one side of said draped product to said side sealer,
said side sealer adapted to receive said film covered products from said inverter and sealing said edges while said product is running at a continuous velocity to form a tube of film containing said products with substantially uniform spacing and severing said excess selvage from said tube of film,
an end sealer,
said side sealer providing said film covered products to said end sealer,
said end sealer providing a seal transverse to said tube of uniformly spaced products while said products are travelling through said end sealer at a substantially continuous velocity, said end seal severing the film tube between adjacent products to provide individually sealed packages at the output of said end sealer,
said end sealer comprising:
and end sealer conveyor belt having a horizontal table portion,
said end sealer conveyor belt being adjacent to and adapted to receive said side-sealed film products from said side sealer conveyor belt,
means for moving said end sealer conveyor belt in a longitudinal direction,
an upper and lower sealing jaw,
a toggle having a centrally-located pivot point,
a rod pivotally connected at one of its ends to one end of said toggle and to said lower sealing jaw at its other end,
a spring-loaded extensible rod pivotally connected at one of its ends to the other end of said toggle and to the upper sealing jaw at its other end,
a first crank connected to said toggle,
means including a first single-revolution clutch having its output shaft connected to drive said first crank,
said first clutch having an input shaft connected to a first drive pulley,
said upper and lower jaws being guided by a carriage, said carriage being supported on longitudinally extending horizontal rods,
means for moving said carriage back and forth in said longitudinal direction,
a second crank being connected to said moving means,
means including a second single-revolution clutch having its output shaft connected to drive said second crank,
a motor,
said first and second clutches having input shafts connected to said motor to rotate in response to rotation of said motor, means for providing an electric signal in response to a package on said end seal conveyor belt, said second clutch being responsive to said electric signal to connect its output shaft to its input shaft to rotate said output shaft through one revolution, a switch connected to said second clutch output shaft to energize said first clutch upon initiation of rotation of said second shaft, said energized first clutch connecting its output shaft to its input shaft for one revolution of the output shaft, the input and output shafts of said first clutch rotating substantially at twice the rate of the input and output shafts of said second clutch;

said first clutch output shaft single-revolution causing said upper and lower jaws to close and then open by moving said first crank and toggle through a single oscillatory motion to their original positions, said second clutch output shaft coupled through said crank to said carriage during its first half revolution causing said carriage to move forward at substantially the velocity of said end seal conveyor belt when said jaws are closed, said carriage comprising rollers to provide a "U"-shaped depression in said end seal conveyor belt in which said lower end seal jaw may move vertically, said depression moving longitudinally with said lower end seal jaw, said carriage moving to its most forward position from its rest position while said jaws are being closed and opened, said second clutch output shaft during the second half of its revolution causing said carriage to return to its rest position while said jaws are in their open and rest position, said upper jaw having a heating element along the lowermost edge to cause said film to seal when said jaws are closed, said upper and lower jaws being adjustable to close at the height of the elevation center line of the package.

3. The film wrapping machine of claim 2 wherein said end sealer spring-loaded extensible rod is capable of being additionally compressed when said upper and lower jaws are closed, said additional compression being sufficient to allow said jaws to close on said package without jamming.

4. An automatic film wrapping machine for wrapping products in heat sealable thermoplastic film in which the flow of products through the machine is substantially continuous and in a straight line comprising:

an infeed conveyor for feeding said product into said machine at a continuous velocity and spacing, a folded film inverter, a film supply for providing folded plastic film to said inverter, a side sealer, said product being inserted into said inverter by said conveyor and surrounded by said film by said inverter while continuing to travel at said continuous flow, said inverter providing the edges of said film at one side of said surrounded product to said side sealer, said side sealer adapted to receive said film surrounded products from said inverter and to seal said edges while said product is running at a continuous velocity to form a tube of film containing said products with substantially uniform spacing, said side sealer comprising:

an upper pair and a lower pair of laterally spaced longitudinally extending belts, each belt in a vertical plane, each belt of said upper pair being vertically aligned above and spaced from the corresponding belt of said lower pair, each of said belts being supported by a pair of pulleys, means for driving at least one of said pulleys and its supported belt, an upper jaw supporting upper jaw rollers and supporting a heating element along its lower edge, said upper jaw rollers being disposed on both sides of said jaw, the rollers on one side of said upper jaw being above the lower portion of one of said upper pair of belts, the rollers on the other side of said upper jaw being above the lower portion of the other of said upper pair of belts, said upper jaw heating element also being above the space between the lower portion of said upper pair of belts, a lower jaw supporting lower jaw rollers along its upper edge, said lower jaw rollers being disposed on both sides of said lower jaw and in contact with the upper portion of the lower pair of belts, the upper edge of said lower jaw being under and aligned with the heating element along the lower edge of said upper jaw, means for forcing said upper jaw down to cause said upper jaw rollers to press the upper pair of belts against the lower pair of belts supported by said lower jaw rollers and to cause said heating element to press against the upper edge of said lower jaw, said heating element being above the space between said upper belts when said forcing means is not actuated, said upper and lower pair of belts having a film input, a side sealer conveyor belt adjacent to said inverting head for supporting said film surrounded products and adapted to receive said products from said inverting head, said inverter providing the edges of the film surrounding the products to the said film input at the space between said upper and lower pair of belts, said film being grasped by said belts and moved longitudinally by said belts when said upper and lower jaws are forced against each other, said film edges being between said heating element of the upper jaw and the upper edge of said lower jaw to form a seal and sever the excess selvage from said tube of film;

an end sealer, said side sealer providing said film surrounded products to said end sealer, said end sealer providing a seal transverse to said tube of uniformly spaced products while said products are travelling through said end sealer, said end sealer severing the film tube between adjacent products to provide individually sealed packages as the output of said end sealer.

5. An automatic film wrapping machine for wrapping products in heat sealable thermoplastic film in which the flow of products through the machine is substantially continuous and in a straight line comprising:

an infeed conveyor for feeding said product into said machine at a continuous velocity and spacing, a film inverter comprising:
a fixed bed,
an inverting head extending in a direction which is substantially an angle of 45° with respect to the longitudinal direction of travel of said product through the machine,
means for movably supporting and releasably securing said inverting head on said fixed bed to allow movement of said support means and said inverting head as a unit along said 45° angular direction in the direction of the extension of the inverting head to allow the end of said inverting head to be positioned and secured near one edge of the product provided by said infeed conveyor to adjust for different product widths,
a film supply providing folded plastic film to said inverter with the fold in said film at said end of said inverting head,
a side sealer,
said product being inserted into said inverter by said infeed conveyor and surrounded by said film by said inverter while continuing to travel at a continuous flow, said inverter providing said surrounded products to said side sealer, with the free edges of said film at one side of said surrounded product,
said side sealer adapted to receive said film covered products from said inverter and to seal said free edges while said product is running at a continuous velocity to form a tube of film containing said products with substantially uniform spacing,
an end sealer,
said side sealer providing said film covered products to said end sealer,
said end sealer providing a seal transverse to said tube of uniformly spaced products while said products are travelling through said end sealer at a substantially continuous velocity, said end sealer severing the film tube between adjacent products to provide individually sealed packages as the output of said end sealer.

6. The machine of claim 5 comprising in addition:
means for longitudinally moving said film supply to cause said fold of said film to be transverse to said end of said inverting head to correspond with said longitudinal position of the end of said inverting head upon extension of said head in said 45° angular direction.

7. An automatic film wrapping machine for wrapping products in heat sealable thermoplastic film in which the flow of products through the machine is substantially continuous and in a straight line comprising:
an infeed conveyor for producing product input to said machine comprising:
a table having an end edge with a longitudinal slot extending to said end edge, said end edge being at an angle of 45° to said slot,
a pair of chain belts,
a plurality of pulleys arranged to support each chain belt in a vertical plane, each belt extending longitudinally along and under said table and vertically at the table end, each belt being transversely spaced from said slot on different sides of said slot, the upper portions of said belts being in proximity to and extending longitudinally under said table,
a plurality of horizontal plates each pivotally connected to each chain belt, said pivot connections having a longitudinal displacement on each plate which is the same as the longitudinal displacement of corresponding points on said chain belts,
a plurality of lugs, each removably and transversely connected to a different plate and projecting vertically upward through said table slot,
means for driving at least one pulley of a chain belt to cause said belts to rotate in said vertical planes about said pulleys, to cause said plates and lugs to move along said slot to the end of said slot,
said slot terminating at said end edge of said table,
said lugs maintaining their vertical projection at the slot termination at the table end as said plates move vertically to cause said lugs to retract below said table,
a folded film inverter comprising,
a fixed bed,
an inverting head extending at substantially an angle of 45° with respect to the longitudinal direction of travel of said product through the machine,
support means for movably supporting and releasably securing said inverting head on said fixed bed to allow movement of said support means and said inverting head as a unit in the direction of the extension of the inverting head to adjust for different product widths,
said inverting head and said infeed conveyor table edge being substantially parallel and proximate to each other, the distance between the point of closest approach of the lugs of said infeed conveyor and said inverting head being constant irrespective of the extension of the inverting head along its direction of extension,
a film supply for providing folded thermoplastic film to said inverter,
a side sealer,
said product being inserted into said inverter by said conveyor and surrounded by said film by said inverter while continuing to travel at said continuous flow, said inverter providing said surrounded products to said side sealer, the free edges of said film at one side of said surrounded product,
said side sealer adapted to receive said film surrounded products from said inverter and to seal said free edges while said product is running at a substantially continuous velocity to form a tube of film containing said products with substantially uniform spacing,
an end sealer,
said side sealer providing said film surrounded products to said end sealer,
said end sealer providing a seal transverse to said tube between uniformly spaced products while said products are travelling through said end sealer at a substantially continuous velocity, said end sealer severing the film tube between adjacent products to provide individually sealed packages at the output of said end sealer.

8. A side sealer for sealing together the free edges of continuously moving adjacent layers of heat sealable thermoplastic film on one side of film-surrounded products flowing in a longitudinal direction and for severing the excess selvage edges from said surrounded products comprising:

upper and lower longitudinally extending belts, each belt being in a vertical plane, said upper belt being vertically aligned above the corresponding lower belt, each of said belts being supported by at least a pair of pulleys, means for driving at least one of said pulleys and its supported belt, means for urging the lower run of said upper belt against the upper run of said lower belt with said layers of film clamped therebetween, an upper jaw supporting a heating element along its lower edge, a lower jaw having an upper edge, said upper edge of said lower jaw being under and aligned with the heating element along the lower edge of said upper jaw, said jaws extending along and adjacent the clamping runs of said belts, and means for pressing said heating element supported by said upper jaw against the upper edge of said lower jaw to seal and sever the selvage of said adjacent layers of said film therebetween when said film is clamped between the upper and lower belts by said urging means, said lower jaw being tapered at the film input portion of its longitudinal dimension, said tapered portion causing said lower jaw to be spaced from said upper jaw at the end of the jaws near the film-input end of said upper and lower belts, said film being in proximity with the heating element of the upper jaw where it is preheated and softened in the tapered spaced region of the jaws, and said film being sealed and severed in the region where said jaws are in pressure contact, said layers of film being supplied with said free edges to run between said belts.

9. The side sealer of claim 8 comprising in addition: a film inverting head for surrounding said products with film and providing said free edges of said film substantially tension free into the nip between said upper and lower belts, said film being gripped by said belts and moved longitudinally by said belts, said film edges being between said heating element of said upper jaw and said upper edge of said lower jaw to form a seal.

10. The side sealer of claim 8 comprising in addition: an inverting head, means for supplying said inverting head with folded film, the edges of film leaving said inverting head being substantially tension free and being gripped between said upper and lower belts to supply the force required to pull said film through said inverting head.

11. The side sealer of claim 10 comprising in addition:

a support means for said inverting head, said support means being adapted to allow said inverting head and support means to be moved as a unit along its extension direction, said inverting head extending at substantially 45° with respect to said longitudinal direction of package flow, said inverting head having one end adapted to receive said film where said film is folded, to invert said film, and to provide the free edges of said inverted film to said side sealer.

12. A side sealer according to claim 8 wherein said heating element is electrically energized and including means for energizing said heating element with a low stand-by current level, and a high current level for film sealing, said high current operative upon actuation of said means for causing said heating element to press against the upper edge of said lower jaw.

13. A side sealer for sealing together the free edges of adjacent layers of heat sealable thermoplastic film on one side of film surrounded products and for severing the excess selvage edges from said surrounded products comprising:

an upper pair and a lower pair of laterally spaced longitudinally extending belts, each belt being in a vertical plane, each belt of said upper pair being vertically aligned above the corresponding belt of said lower pair, each of said belts being supported by at least a pair of pulleys, means for driving at least one of said pulleys and its supported belt, an upper jaw supporting upper jaw rollers and supporting a heating element along its lower edge, said upper jaw rollers being disposed on both sides of said jaw, the rollers on one side of said upper jaw being above the lower portion of one of said upper pair of belts, the rollers on the other side of said upper jaw being above the lower portion of the other of said upper pair of belts, said upper jaw heating element also being above the space between the lower portion of said upper pair of belts, a lower jaw supporting lower jaw rollers along its upper edge, said lower jaw rollers being disposed on both sides of said lower jaw and in contact with the upper portion of the lower pair of belts, the upper edge of said lower jaw being under and aligned with the heating element along the lower edge of said upper jaw, and means urging said upper jaw down to press the upper pair of belts against the lower pair of belts supported by said jaw rollers;

means for pressing said heating element against the upper edge of said lower jaw when sealing said adjacent layers of said film, said layers of film being supplied to run with said free edges between said belts.

14. The side sealer of claim 13 comprising in addition:

means for moving said sealer vertically to adjust the height of the region of contact of said upper and lower belts, and means for moving said sealer laterally, whereby said side sealer may be used with a product of different height and width by change of the lateral and vertical position of the sealer by said moving means.

15. An automatic film wrapping machine for wrapping products in heat sealable thermoplastic film in which the flow of products through the machine is substantially continuous and in a straight line comprising:

a film inverting head, an infeed conveyor for providing packages to the input of said inverting head, means for providing folded film to said inverting head, said inverting head inverting said film and enveloping said packages in said film while said film is substantially tension free, a side sealer for sealing together the free edges of adjacent layers of said heat sealable thermoplastic film on one side of the film surrounded products and for severing the excess selvage edges from said surrounded products comprising:

upper and lower longitudinally extending belts, each belt being in a vertical plane, said upper belt being vertically aligned above the corresponding lower belt, each of said belts being supported by at least a pair of pulleys, means for driving at least one of said pulleys and its supported belt, means for urging the lower run of said upper belt against the upper run of said lower belt with said layers of film clamped therebetween, an upper jaw supporting a heating elements along its lower edge, said upper jaw heating element also being above the lower portion of said upper belt, a lower jaw having an upper edge, said upper edge of said lower jaw being under and aligned with the heating element along the lower edge of said upper jaw, said jaws extending along and adjacent the clamping runs of said belts, means for pressing said heating element supported by said upper jaw against the upper edge of said lower jaw to seal and sever the selvage of said adjacent layers of said film therebetween when said film is clamped between the upper and lower belts by said urging means, said lower jaw being tapered at the film input portion of its longitudinal dimension, said tapered portion causing said lower jaw to be spaced from said upper jaw at the end of the jaws near the film-input end of said upper and lower belts, said film being in proximity with the heating element of the upper jaw where it is preheated and softened in the tapered space region of the jaws, and said film being sealed and severed in the region where said jaws are in pressure contact, said layers of filimg being supplied with said free edges to run between said belts, means for removing said selvage edges after said film has been sealed, an end sealing mechanism having end sealing jaws, means for closing the end sealing jaws of said end seal mechanism on that portion of the film between the packages to simultaneously seal the end of said packages and sever the film between successive packages at the seal, said end sealing jaws moving at approximately the same velocity and direction as said film where said jaws are closed, said end sealing jaws moving in the opposite direct to said film after said seal is made and said jaws are opened, said end sealing mechanism having means to deliver said sealed packages to the output of said machine.

16. An automatic wrapping machine for wrapping product in heat sealable thermoplastic film in which the product is introduced manually into the machine comprising: a film inverter comprising:

an inverting head extending in a direction substantially 45° with respect to the longitudinal direction of product flow through said machine, a film supply for providing folded thermoplastic film substantially tension free to said inverter, said product being manually pushed into said film supplied inverting head to surround product with film, a side sealer comprising:

a side sealer for sealing together the free edges of adjacent layers of heat sealable thermoplastic film on one side of film surrounded products and for severing the excess selvage edges from said surrounded products, upper and lower longitudinally extending belts, each belt being in a vertical plane, said upper belt being vertically aligned above the corresponding lower belt, each of said belts being supported by at least a pair of pulleys, means for driving at least one of said pulleys and its supported belt, means for urging the lower run of said upper belt against the upper run of said lower belt with said layers of film clamped therebetween, an upper jaw supporting a heating element along it lower edge, said upper jaw heating element also being above the lower portion of said upper belt, a lower jaw having an upper edge, said upper edge of said lower jaw being under and aligned with said heating element along the lower edge of said upper jaw, said jaws extending along and adjacent the clamping runs of said belts, means for pressing said heating element supported by said upper jaw against the upper edge of said lower jaw to seal and sever the selvage of said adjacent layers of said film therebetween when said film is clamped between the upper and lower belts by said urging means, said lower jaw being tapered at the film input portion of its longitudinal dimension, said tapered portion causing said lower jaw to be spaced from said upper jaw at the end of the jaws near the film-input end of said upper and lower belts, said film being preheated and softened in the tapered space region of the jaws, and said film being sealed and severed in the region where said jaws are in pressure contact, said layers of film being supplied with said free edges to run between said belts to form a tube, an end sealer, said side sealer providing said film covered products to said end sealer, said end sealer providing a seal transverse to said tube of uniformly spaced products, said end sealer severing said film tube between adjacent products to provide individually sealed packages as the outputs of said end sealer.

17. An automatic film wrapping machine for wrapping products in heat sealable thermoplastic film in which the flow of products through the machine is substantially continuous and in a straight line said machine having a frame for supporting elements comprising:

a film inverting head, an infeed conveyor for providing packages to the input of said inverting ehad, means for providing folded film to said inverting head, said inverting head inverting said film and enveloping said packages in said film while said film is substantially tension free, a side sealing means for continuously heat sealing the free edges of said folded film in proximity to said package, severing the excess selvage from the package and drawing said film over said inverting head, means for removing the selvage of the film after said film has been sealed, an end sealing mechanism comprising a carriage mounted for reciprocating longitudinal motion on said frame, means for providing the side sealed packages to said end seal mechanism, upper and lower sealing jaws mounted on said carriage for movement transverse to said longitudinal motion above and below the path of said packages passing through said end sealing mechanism, a toggle crank arm mounted for rotation on said frame and driven by a single revolution clutching means, a linkage from said crank arm to each of said upper and lower jaws to reciprocate said jaws in said transverse movement with approximate harmonic velocity derived from rotation of said crank arm, said velocity being a maximum at the start of closing said jaws and approximately a minimum as said jaws close to provide dwell time during minimum velocity to make the transverse seal, a single motive power drive means for reciprocally driving said carriage longitudinally of said frame and said toggle crank arm transversely of said frame to provide said reciprocating longitudinal motion synchronized with the closing of said sealing jaws on that portion of the film between the packages to simultaneously seal the ends of said packages and sever the film between successive packages at the seal, said sealing jaws moving longitudinally at approximately the same velocity and direction as said film when said jaws are closed, said sealing jaws moving in the opposite direction to said film after said seal is made when said jaws are opened, said end sealing mechanism having means to deliver said sealed packages to the output of said machine.

18. Apparatus according to claim 17 wherein:

said inverting head extends at substantially an angle of 45° with respect to the longitudinal direction of travel of said product through the machine and including:

means for movably supporting and releasably securing said inverting head on a fixed bed to allow movement of said support means and said inverting head as a unit in the direction of the extension of the inverting head to allow the end of said inverting head to be positioned and secured near one edge of the packages provided by said infeed conveyor to adjust for different product widths.

19. A side sealer for sealing together the free edges of adjacent layers of heat sealable thermoplastic film on one side of film surrounded products and for severing the excess selvage edges from said surrounded products comprising:

an upper pair and a lower pair of laterally spaced longitudinally extending belts, each belt in a vertical plane, each belt of said upper pair being vertically aligned above and spaced from the corresponding belt of said lower pair, each of said belts being supported by a pair of pulleys, means for driving at least one of said pulleys and its supported belt, an upper jaw supporting upper jaw rollers and supporting a heating element along its lower edge, said upper jaw rollers being disposed on both sides of said jaw, the rollers on one side of said upper jaw being above the lower portion of one of said upper pair of belts, the rollers on the other side of said upper jaw being above the lower portion of the other of said upper pair of belts, said upper jaw heating element also being above the space between the lower portion of said upper pair of belts, a lower jaw supporting lower jaw rollers along its upper edge, said lower jaw rollers being disposed on both sides of said lower jaw and in contact with the upper portion of the lower pair of belts, the upper edge of said lower jaw being under and aligned with the heating element along the lower edge of said upper jaw, means for forcing said upper jaw down to cause said upper jaw rollers to press the upper pair of belts against the lower pair of belts supported by said lower jaw rollers and to cause said heating element to press against the upper edge of said lower jaw, said heating element being above the space between said upper belts when said forcing means is not actuated, said upper and lower pair of belts having a film input region, means for providing the edges of the film surrounding the products to the said film input region at the space between said upper and lower pair of belts, said film being grasped by said belts and moved longitudinally by said belts when said upper and lower jaws are forced against each other, said film also being between said heating element of the upper jaw and the upper edge of said lower jaw to form a seal and sever the excess selvage from said tube of film.

20. The side sealer of claim 19 wherein said lower jaw is tapered at the film input portion of its longitudinal dimension, said tapered portion causing said lower jaw to be spaced from said upper jaw at the end of the jaws near the film-input end of said upper and lower belts, said film being in proximity with the heating element of the upper jaw where it is preheated and softened in the tapered spaced region of the jaws, and said film is sealed and severed in the region where said jaws are in pressure contact.

21. The side sealer of claim 20 comprising in addition:

a pair of angled rollers at the film input of said pairs of belts, said angled rollers making pressure and frictional contact with said film and being so disposed that movement of said film in the belt direction causes a transverse force on said film tending to pull said film in toward said belts and tightening said film about said products.

* * * * *